Jan. 27, 1942.   W. A. RAY   2,271,307
THERMAL OPERATOR
Filed Oct. 21, 1938
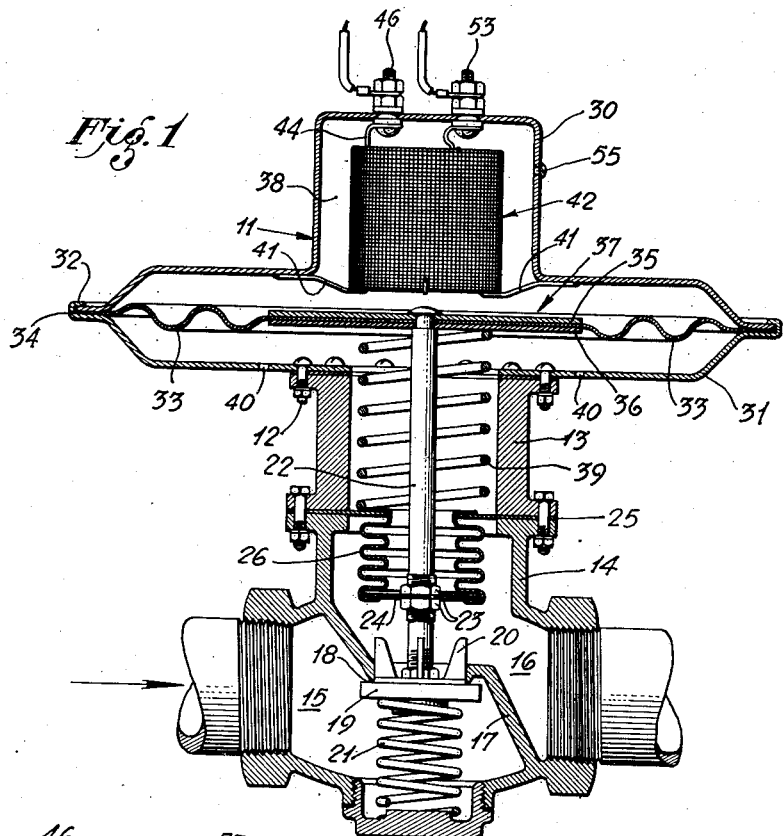
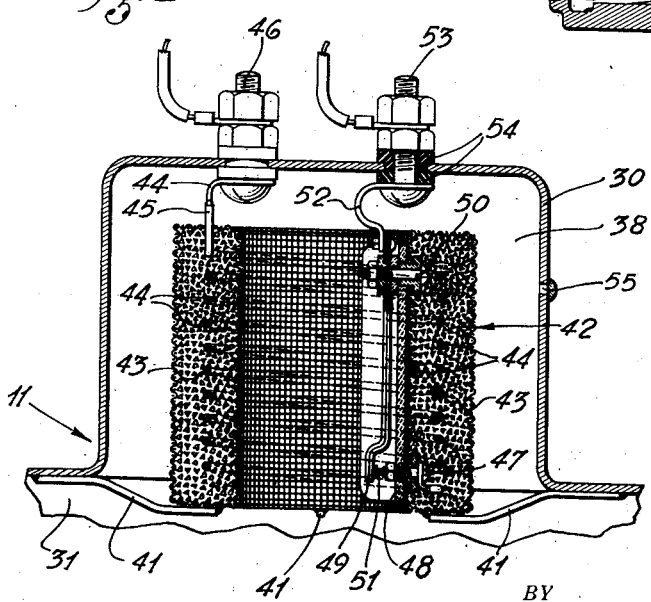
WILLIAM A. RAY,
INVENTOR.
BY John H. Rouse
ATTORNEY Patented Jan. 27, 1942

2,271,307

UNITED STATES PATENT OFFICE 2,271,307

THERMAL OPERATOR

William A. Ray, Glendale, Calif.

Application October 21, 1938, Serial No. 236,259

3 Claims. (Cl. 60—23)

My present invention relates to fluid pressure operated motors of the type in which heat is employed as the pressure producing agent.

An object of my invention is the provision of a novel motor employing an adsorbable gas and a material for adsorbing said gas at normal temperature and releasing a large proportion of it when the temperature of said material is raised, thus producing pressure to operate said motor.

Adsorption occurs when a gas is brought into contact with a material, the gas becoming concentrated on the surface thereof. In general, the larger the surface of the material, the greater the adsorption. For that reason, I preferably employ carbon material, such as wood charcoal, which possesses a large specific surface. Other porous materials, particularly earths such as kieselguhr, also possess highly adsorbent properties.

While all gases are more or less adsorbable, it has been found that ammonia, ethylene and carbon dioxide are adsorbed in large quantities by charcoal at normal temperatures. On heating to temperatures which are not destructive to the charcoal, a major proportion of the adsorbed gas is liberated. On cooling, the gas is readsorbed.

A further object of my invention is the provision of means for disposing the adsorbent material in efficient heat exchange relation to an electric heating element.

A further object of the invention is the provision of means for regulating the heating process so that a predetermined temperature may be rapidly attained but not exceeded.

Other objects and advantages of my invention will be found in the description, the drawing and the appended claims.

For a more complete understanding of the invention, reference may be had to the following detailed description and accompanying drawing, in which Figure 1 is a sectional view of a motor embodying my invention and adapted, by way of example, to the operation of a fluid control valve; and Figure 2 is an enlarged sectional view of the adsorbent material containing and heating means of Fig. 1.

In the drawing, a fluid pressure operated motor, generally indicated by the numeral 11, is shown secured, as by screws 12, to an extension 13 of a valve casing 14 having an inlet 15 and an outlet 16 separated by a ported partition 17 provided with a valve seat 18 with which a valve member 19, having guides 20, cooperates to control fluid flow through the valve. A compression spring 21 normally biases the valve member to closed position. Threadedly secured in the valve member 19 is an operating valve stem 22 to which is secured by the nuts 23 a washer 24. Secured between the extension 13 and the upper surface of the casing 14 is an apertured disk member 25. Secured to said disk member 25 and the washer 24, as by solder, is a collapsible bellows member 26 sealing the upper end of the valve outlet.

The motor 11 comprises a housing 30, and a supporting member 31, secured together, as by the folded-in end portion 32 of member 31, with a corrugated metallic diaphragm 33 therebetween which may be additionally sealingly secured to the housing 30 as by solder 34. Secured to the diaphragm 33 by the riveted-over reduced upper end portion of the valve stem 22 are upper and lower stiffening members 35 and 36, respectively. The complete diaphragm member, comprising the foregoing, is generally indicated by the numeral 37. The diaphragm member 37 with the housing 30 define a hermetically sealed compartment 38. A spring 39, compressed between the disk member 25 and the diaphragm member 37, urges the diaphragm member upward. The supporting member 31 is provided with vent apertures 40.

Supported in the housing 30, by wires 41, is a closed perforate container 42 of general hollow cylindrical form and made of wire mesh material and containing charcoal or carbon granules 43. The supporting wires 41 may be secured to the container and the housing by solder or in any other suitable manner.

An electrical heating element, comprising a coil of resistance wire 44 having an electrically insulating outer covering 45 of heat resistant material such as glass or other vitreous material, is supported among the carbon granules in the container at its upper end by a terminal 46 and at its lower end by a terminal 47.

Supporting the terminal 47 and insulatingly secured thereby to the inner side wall of the container, is a channel shaped member 48 of insulating material. A bimetallic member 49 is secured to the upper end portion of the channel member by the screw 50, insulatingly extending through the inner side wall of the container, and carries on its lower end portion a contact 51 cooperable with, and at normal temperature in contact with, the inner end portion of terminal 47 which may be tipped with suitable contact material. The upper end portion of the bimetallic member is connected by wire 52 to terminal 53. The terminals 46 and 53 are insulated from the upper wall of the housing and are sealed therein by the compressible sealing members 54.

An aperture 55 is provided in a wall of the housing 30 to admit a suitable highly adsorbent gas, such as ammonia, to the compartment 38 after final assembly of the device, which aperture may then be sealed as by solder in a manner well known in the art.

When the heating element is energized, adsorbed gas is liberated from surface concentration on the carbon granules, thus raising the fluid pressure in the compartment 38 and forcing the diaphragm member 37 downward against the spring bias to open the valve. On deenergization of the heating element with resultant cooling of the carbon granules, re-adsorption of the gas occurs, lowering the fluid pressure and permitting the valve to close.

So that rapid heating may be effected without danger of such excessive rise of temperature resulting that might damage the carbon granules, I have provided a thermostatic cut-out in the bimetallic member 49 which is arranged to open the heater circuit on predetermined rise of temperature in the container. When the motor is continuously connected to a source of energy, the thermostat functions to intermittently open and close the heater circuit.

The container 42 may preferably be of any tenuous form, such as that shown, which will present a large surface area so that the carbon granules therein may readily adsorb the gas.

While I have shown and described a preferred embodiment of my invention, applied, by way of example, to operation of a fluid control valve, I wish it to be understood that modifications may be made and that no limitations are intended than are imposed by the scope of the appended claims.

I claim as my invention:

1. In a fluid pressure operated motor, in combination, a housing, a flexible member closing an opening in a wall of said housing, a perforate container supported in said housing in spaced relation to the walls thereof, adsorbent material within said container, electrical heating means embedded in said material, a highly adsorbable gas within said housing and container and in contact with said material, and thermostatic means responsive to the temperature of said material for controlling said electrical heating means.

2. In a fluid pressure operated motor, in combination, a housing, a metallic diaphragm member closing an aperture in a wall of said housing, said housing with said diaphragm member defining a hermetically sealed chamber, a tenuous perforate closed container supported within said housing in spaced relation to the walls thereof, an electrical heating element in said container and electrically insulated therefrom, means for electrically connecting a source of current to said heating element and extending through a wall of said housing and insulatingly sealed therein, carbon material in said container and subject to the temperature of said heating element, a highly adsorbable gas within said chamber and in contact with said carbon material, and means for transmitting movement of said diaphragm member to a member to be moved.

3. In a fluid pressure operated motor, in combination, a housing, a metallic diaphragm member closing an aperture in a wall of said housing, said housing with said diaphragm member defining a hermetically sealed chamber, a tenuous perforate closed container supported within said housing in spaced relation to the walls thereof, an electrical heating element in said container and electrically insulated therefrom, means for electrically connecting a source of current to said heating element and extending through a wall of said housing and insulatingly sealed therein, carbon material in said container and subject to the temperature of said heating element, a highly adsorbable gas within said chamber and in contact with said carbon material, means for transmitting movement of said diaphragm member to a member to be moved, and thermostatic means responsive to the temperature of said carbon material for opening a circuit through said heating element on a predetermined rise of temperature.

WILLIAM A. RAY.